(12) United States Patent
Sun et al.

(10) Patent No.: US 11,163,989 B2
(45) Date of Patent: Nov. 2, 2021

(54) ACTION LOCALIZATION IN IMAGES AND VIDEOS USING RELATIONAL FEATURES

(71) Applicant: Google LLC, Mountain View, CA (US)

(72) Inventors: Chen Sun, San Francisco, CA (US); Abhinav Shrivastava, Mountain View, CA (US); Cordelia Luise Schmid, Saint Ismier (FR); Rahul Sukthankar, Orlando, FL (US); Kevin Patrick Murphy, Mountain View, CA (US); Carl Martin Vondrick, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/637,960

(22) PCT Filed: Aug. 6, 2019

(86) PCT No.: PCT/US2019/045207
§ 371 (c)(1),
(2) Date: Feb. 10, 2020

(87) PCT Pub. No.: WO2020/033345
PCT Pub. Date: Feb. 13, 2020

(65) Prior Publication Data
US 2021/0166009 A1 Jun. 3, 2021

Related U.S. Application Data

(60) Provisional application No. 62/715,225, filed on Aug. 6, 2018.

(51) Int. Cl.
*G06K 9/00* (2006.01)
*G06K 9/46* (2006.01)
*G06N 3/08* (2006.01)

(52) U.S. Cl.
CPC ..... *G06K 9/00342* (2013.01); *G06K 9/00718* (2013.01); *G06K 9/46* (2013.01); *G06N 3/08* (2013.01)

(58) Field of Classification Search
CPC .. G06K 9/00342; G06K 9/00718; G06K 9/46; G06N 3/08
(Continued)

(56) References Cited

U.S. PATENT DOCUMENTS

| 10,210,392 B2* | 2/2019 | Wu | G06K 9/00718 |
| 2016/0091964 A1* | 3/2016 | Iyer | G02B 27/017 345/633 |

(Continued)

OTHER PUBLICATIONS

PCT International Preliminary Report in International Application No. PCT/US2019/045207, dated Feb. 18, 2021, 12 pages.
(Continued)

*Primary Examiner* — Mark Roz
(74) *Attorney, Agent, or Firm* — Fish & Richardson P.C.

(57) ABSTRACT

Methods, systems, and apparatus, including computer programs encoded on a computer storage medium, for performing action localization in images and videos. In one aspect, a system comprises a data processing apparatus; a memory in data communication with the data processing apparatus and storing instructions that cause the data processing apparatus to perform image processing and video processing operations comprising: receiving an input comprising an image depicting a person; identifying a plurality of context positions from the image; determining respective feature representations of each of the context positions; providing a feature representation of the person and the feature representations of each of the context positions to a context neural network to obtain relational features, wherein the relational features represent relationships between the person and the
(Continued)

context positions; and determining an action performed by the person using the feature representation of the person and the relational features.

19 Claims, 6 Drawing Sheets

(58) Field of Classification Search
 USPC ............................................................ 382/156
 See application file for complete search history.

(56) References Cited

U.S. PATENT DOCUMENTS

| | | | |
|---|---|---|---|
| 2017/0262996 | A1 | 9/2017 | Mihir et al. |
| 2019/0180149 | A1* | 6/2019 | Knittel ..................... G06N 3/08 |
| 2019/0347486 | A1* | 11/2019 | Yun ...................... G06K 9/6269 |

OTHER PUBLICATIONS

Carreira et al., "Quo vadis, action recognition? A new model and the Kinetics dataset" arXiv, Jul. 2017, 10 pages.
Chao et al., "Learning to detect human-object interactions" arXiv, Mar. 2018, 10 pages.
Chen et al., "Deeplab: Semantic image segmentation with deep convolutional nets, atrous convolution, and fully connected crfs" arXiv, Jun. 2016, 14 pages.
Dai et al., "Detecting visual relationships with deeprelational networks" CVPR, 2017, 11 pages.
Gilmer et al., "Neural message passing for quantum chemistry" arXiv, Jun. 2017, 14 pages.
Girdhar et al., "Attentional Pooling for Action Recognition" arXiv, Nov. 2017, 12 pages.
Gkioxari et al., "Contextual action recognition with R*CNN" ICCV, 2015, 9 pages.
Gkioxari et al., "Detecting and recognizing human-object intaractions" arXiv, Oct. 2019, 9 pages.
Gkioxari et al., "Finding action tubes" arXiv, Nov. 2014, 10 pages.
Gu et al., "AVA: A video dataset of spatio-temporally localized atomic visual actions" arXiv, Apr. 2018, 15 pages.
Gupta et al., "Visual semantic role labeling" arXiv, May 2015, 11 pages.
Hamilton et al., "Representation learning on graphs: Methods and applications" arXiv, Apr. 2018, 24 pages.
He et al., "Deep residual learning for image recognition" arXiv, Dec. 2015, 12 pages.
Hou et al. "Tube Convolutional Neural Network (T-CNN) for Action Detection in Videos", IEEE International Conference on Computer Vision, 2017, pp. 5822-5831.
Hu et al., "Relation Networks for Object Detection", IEEE Conference on Computer Vision and Pattern Recognition, 2018, pp. 3588-3597.
Huang et al., "Speed/Accuracy trade-offs for modern convolutional object detectors", IEEE Conference on Computer Vision and Pattern Recognition, 2017, pp. 7310-7311.
Jhunag et al., "Towards understanding action recognition", IEEE International Conference on Computer Vision, 2013, pp. 3192-3199.
Johnson et al., "Clevr: A diagnostic dataset for compositional language and elementary visual reasoning", IEEE Conference on Computer Vision and Pattern Recognition, 2017, pp. 2901-2910.
Kalogeiton et al., "Action tubelet detector for spatio-temporal localization", IEEE International Conference on Computer Vision, 2017, pp. 4405-4413.
Kay et al., "The kinetics human action video dataset", arXiv:1705.06950v1, May 2017, 22 pages.
Kipf et al., "Neural relational inference for interacting systems", arXiv:1802.04687, 2018, 17 pages.
Lin et al., "Microsoft COCO: Common Objects in Context" arXiv:1405.0312v3, Feb. 2015, 15 pages.
Liu et al., "SSD: Single Shot Multibox Detector", arXiv: 1512.02325v5, Dec. 2016, 17 pages.
Loshchilov et al., "SGDR: Stochastic Gradient Descent with Warm Restarts", arXiv:1608.03983v5, May 2017, 16 pages.
Lu et al., "Visual Relationship Detection with Language Priors", arXiv:1608.00187v1, Jul. 2016, 19 pages.
PCT International Search Report and Written Opinion in International Application No. PCT/US2019/045207, dated Oct. 24, 2019, 19 pages.
Peng et al., "Multi-region two-stream R-CNN for action detection", European Conference on Computer Vision, Spring, Cham, 2016, pp. 744-759.
Peyre et al., "Weakly supervised learning of visual relations", IEEE International Conference on Computer Vision, 2017, pp. 5179-5188.
Ren et al., "Faster R-CNN: Towards Real time Object Detection with Region Proposal Networks", Advances in Neural Information Processing Systems, 2015, pp. 91-99.
Santoro et al., "A simple neural network module for relational reasoning", Advances in Neural Information Processing Systems, 2017, pp. 4967-4976.
Sharma, "Action Recognition using Visual Attention" arXiv, Feb. 2016, 11 pages.
Shrivastava et al., "Beyond Skip Connections: Top-Down Modulation for Obejct Detection", arXiv:1612.06851v2, Sep. 2017, 11 pages.
Singh et al., "Online real-time multiple spatiotemporal action localisation and prediction", IEEE International Conference on Computer Vision, 2017, pp. 3637-3648.
Sun et al., "Actor-Centric Relation Network" arXiv, Jul. 2018, 17 pages.
Varol et al., "Long-term Temporal Convolutions for Action Recognition", arXiv:1604.04494v2, Jun. 2017, 8 pages.
Vaswani et al., "Attention is all you need", Advances in Neural Information Processing Systems, 2017, pp. 5998-6008.
Velickovic et al., "Graph Attention Networks", arXiv:1710.10903v3, Feb. 2018, 12 pages.
Wang et al., "Non-local neural networks", IEEE Conference on Computer Vision and Pattern Recognition, 2018, pp. 7794-7803.
Weijiang et al., "Attention Focused Spatial Pyramid Pooling for Boxless Action Recognition in Still Images" International Conference on Computer Analysis of Images and Patterns, Oct. 2017, 8 pages.
Zhang et al., "A Structured Model for Action Detection" arXiv, Jun. 2019, 10 pages.
Zhang et al., "Ppr-fcn: Weakly supervised visual relation detection via parallel pairwise r-fcn", IEEE International Conference on Computer Vision, 2017, pp. 4233-4241.
Zolfaghari et al., "Chained multi-stream networks exploiting pose, motion and appearance for action classification and detection", IEEE International Conference on Computer Vision, 2017, pp. 2904-2913.

* cited by examiner

ACTION LOCALIZATION IN IMAGES AND VIDEOS USING RELATIONAL FEATURES

This application is a National Stage Application under 35 U.S.C. § 371 and claims the benefit of International Application No. PCT/US2019/045207, filed Aug. 6, 2019, which claims priority to U.S. Application No. 62/715,225, filed Aug. 6, 2018, the disclosure of which is incorporated herein by reference.

BACKGROUND

This specification relates to image processing using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that performs action localization. The system can be trained using end-to-end machine learning training techniques to process an image (or a sequence of video frames) to localize people depicted in the image and to identify the actions being performed by the people depicted in the image.

According to a first aspect there is provided a system including a data processing apparatus and a memory in data communication with the data processing apparatus storing instructions that cause the data processing apparatus to perform operations including receiving an input that includes an image. The image is provided to a vision neural network to obtain a visual feature representation of the image. The image is provided to a person detection neural network to obtain data indicating a position of a person depicted in the image. A feature representation of the person is determined using the data indicating the position of the person and the visual feature representation of the image. A set of context positions are identified from the image. Respective feature representations of each of the context positions are determined. The feature representation of the person and the feature representations of each of the context positions are provided to a context neural network to obtain relational features, where the relational features represent relationships between the person and the context positions. An action performed by the person is determined using the feature representation of the person and the relational features.

In some implementations, the vision neural network is configured to receive an input including an image, and process the input to generate a visual feature representation of the image.

In some implementations, the person detection neural network is configured to receive an input including an image, and process the input to generate an output including data indicating a position of a person depicted in the image.

In some implementations, the context neural network is configured to receive an input including: (i) a feature representation of a person depicted in an image, and (ii) feature representations of each of a plurality of context positions from the image, and process the input to generate an output including a set of relational features, where the relational features represent relationships between the person and the context positions.

In some implementations, the image is a video frame, and the input further includes a set of additional video frames.

In some implementations, the vision neural network is a three-dimensional convolutional neural network.

In some implementations, the person detection neural network is a convolutional region proposal neural network.

In some implementations, determining a feature representation of the person using the data indicating the position of the person and the visual feature representation of the image includes cropping a region of the visual feature representation corresponding to the position of the person in the image.

In some implementations, identifying a set of context positions from the image includes identifying every position in the image as a context position.

In some implementations, identifying a set of context positions from the image includes processing the image using an object detection neural network to obtain data indicating respective positions of a set of objects depicted in the image.

In some implementations, determining a feature representation of a context position includes cropping a region of the visual feature representation corresponding to the context position.

In some implementations, determining a feature representation of a context position includes cropping a region of an intermediate output of the vision neural network corresponding to the context position.

In some implementations, determining an action performed by the person using the feature representation of the person and the relational features includes providing the feature representation of the person and the relational features as an input to an action neural network, where the action neural network is configured to generate an output comprising data defining an action performed by the person.

In some implementations, the action neural network, the context neural network, the vision neural network, and the person detection neural network are jointly trained by an end-to-end machine learning training technique.

In some implementations, providing the feature representation of the person and the feature representations of the context positions to a context neural network to obtain relational features includes determining an actor representation from: (i) the feature representation of the person, and (ii) the position of the person. For each context position, an object representation of the context position is determined from: (i) the feature representation of the context position, and (ii) the context position. The actor representation and the object representations are processed using the context neural network to obtain the relational features.

In some implementations, processing the actor representation and the object representations using the context neural network to obtain the relational features includes, for each object representation, processing a pair of representations including the actor representation and the object representation by one or more context neural network layers to generate an intermediate output. The relational features are generated from the intermediate outputs.

In some implementations, generating the relational features from the intermediate outputs includes average pooling the intermediate outputs.

In some implementations, generating the relational features from the intermediate outputs includes processing the intermediate outputs by one or more convolutional context neural network layers and average pooling the convolutional context neural network layer outputs.

In some implementations, processing the actor representation and the object representations using the context neural network to obtain the relational features includes determining a set of integrated object representations, where each integrated object representation is associated with a respective saliency neural network. Determining an integrated object representation includes, for each object representation, processing a pair of representations including the actor representation and the object representation by the saliency neural network associated with the integrated object representation to generate a respective saliency score. The integrated object representation is determined by combining the object representations using the saliency scores. For each integrated object representation, a pair of representations including the actor representation and the integrated object representation are processed by one or more context neural network layers to generate an intermediate output. The relational features are generated from the intermediate outputs.

In some implementations, determining the integrated object representation by combining the object representations using the saliency scores includes processing the saliency scores by a soft-max layer.

According to another aspect, there is provided a computer-implemented method including the operations of the system of the first aspect.

According to another aspect, there are provided one or more computer storage media storing instructions that when executed by one or more computers cause the one or more computers to perform the operations of the system of the first aspect.

It will be appreciated that features described with respect to one aspect may be combined with features of other aspects. For example, features described in respect of a system may also be combined with features described in respect of a method and/or computer storage media.

Particular embodiments of the subject matter described in this specification can be implemented so as to realize one or more of the following advantages.

The system described in this specification can identify the action being performed by a person based on: (i) "person" features characterizing the spatio-temporal appearance of the person, and (ii) "relational" features characterizing spatial and semantic relationships between the person and a variety of scene features depicted in the image. Processing the relational features in addition to the person features may enable the system described in this specification to identify actions with greater accuracy than, e.g., systems that rely on person features alone without the benefit of relational features. This is an improvement in the fields of image processing and machine learning.

The system described in this specification can generate relational features characterizing spatial and semantic relationships between the person and a variety of scene features using differentiable neural network operations. Therefore, the system described in this specification can be trained to accurately generate action localization outputs using end-to-end machine learning training techniques, e.g., stochastic gradient descent. As such, the training process may be performed more efficiently and require fewer computational resources. This is also an improvement in the fields of image processing and machine learning.

The system described in this specification can learn to discriminatively identify relationships (i.e., between the person and certain scene features) that are relevant to the task of action localization, e.g., rather than treating the relationships between the person and each of the scene features equally. This can enable the system described in this specification to reduce consumption of computational resources (e.g., memory and computing power) while maintaining or increasing accuracy by discounting noisy or irrelevant scene features during action localization. This is also an improvement in the fields of image processing and machine learning.

The system described in this specification is trained based on training data that only requires the location of the person and the action being performed by the person in each training image to be labeled. In contrast, some conventional systems require training data where the location of the person, the location of other objects, and the relationship between the person and the other objects are labeled. Such labeling can be difficult, time-consuming, and expensive. By obviating the need to label the location of other objects and the relationship between the person and the other objects, the system described in this specification can be trained more readily than some conventional systems. This is also an improvement in the fields of image processing and machine learning.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a system implemented as computer programs on one or more computers in one or more locations that performs action localization. Action localization refers to determining the position of a person depicted in an image (or video frame) and identifying an action being performed by the person (e.g., throwing a ball, swinging a bat, picking up a particular object, etc.). The system detects the action being performed by a person based on: (i) "person" features characterizing the spatial-temporal appearance of the person, and (ii) "relational" features characterizing spatial and semantic relationships between the person and a variety of scene features (e.g. objects) depicted in the image. Processing the relational features in addition to the person features can enable the system to generate more accurate action localization outputs. These features and other features are described in more detail below.

Figure 1:
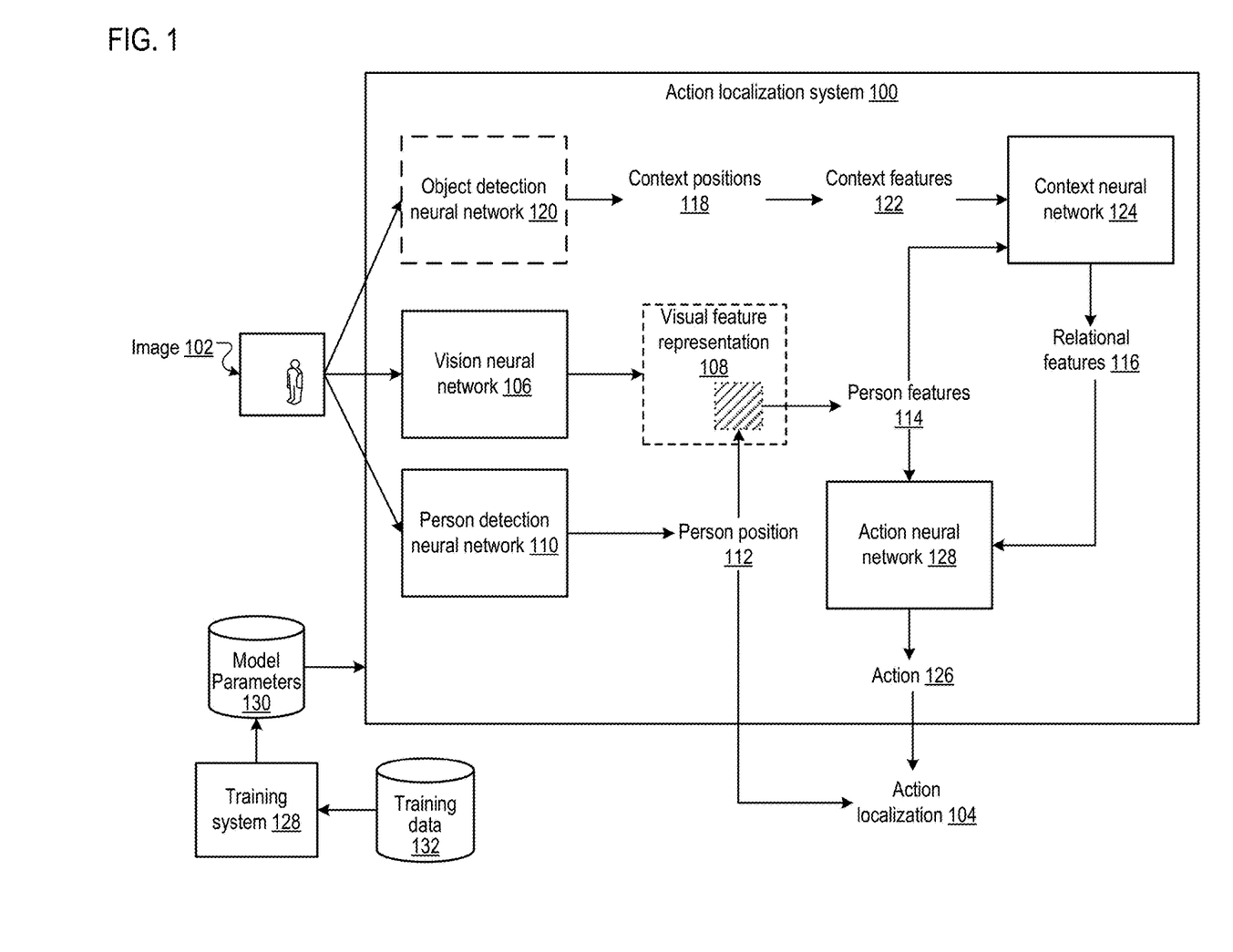
FIG. 1 is a block diagram of an example action localization system.

FIG. 1 is a block diagram of an example action localization system 100. The action localization system 100 is an example of a system implemented as computer programs on one or more computers in one or more locations in which the systems, components, and techniques described below are implemented.

The action localization system 100 is configured to process an input including an image 102 depicting a person performing an action to generate an action localization 104 output. The action localization 104 defines: (i) the position of the person depicted in the image 102, and (ii) an action being performed by the person depicted in the image 102. The position of the person depicted in the image 102 may be represented by, for example, coordinates defining a bounding box around the person depicted in the image 102. The action being performed by the person depicted in the image may be, for example, jumping, sitting, standing, hugging, or eating.

The image 102 processed by the system 100 may be a video frame from a video, and the system 100 may additionally process multiple other video frames from the video to generate the action localization 104. For example, the system 100 may process a sequence of consecutive video frames from a video to generate the action localization 104 for a central video frame from the sequence of video frames. In addition to the video frames, the system 100 may additionally process a corresponding set of "optical flow" frames (e.g., determined using optical flow techniques) that characterize the movement of objects and scene features between video frames.

Generally, the image 102 may depict multiple people performing respective (possibly different) actions, and the action localization system 100 can generate respective action localization outputs 104 for each person depicted in the image 102. For convenience, this document will describe generating an action localization output 104 for a particular person depicted in the image 102.

The system 100 processes the image 102 using a vision neural network 106 in accordance with current values of vision neural network parameters to generate a visual feature representation 108 of the image 102. The visual feature representation 108 may be represented in any appropriate numerical format. For example, the vision neural network 106 may be a convolutional neural network, in which case the visual feature representation 108 may be represented as a matrix of feature outputs. In a particular example, if the system 100 receives an input including multiple video frames (i.e., where the image 102 is one of the video frames), then the vision neural network may be a three-dimensional (3D) convolutional neural network. A 3D convolutional neural network refers to a convolutional neural network that includes one or more convolutional layers with 3D convolutional filters (i.e., filters with both spatial and temporal dimensions). An example of a 3D convolutional neural network is described with reference to: Saining Xie et al., "Rethinking Spatiotemporal Feature Learning for Video Understanding", European Conference on Computer Vision (ECCV), 2018. Other 3D convolutional neural networks can also be used. A 3D convolutional neural network can produce a visual feature representation 108 with integrated spatiotemporal features (i.e., features computed across both the spatial and temporal dimensions), which may result in improved action localization.

The system 100 determines the position of the person depicted in the image 102 by processing the image 102 using a person detection neural network 110 in accordance with current values of person detection neural network parameters. The person detection neural network 110 is configured to generate a person position 112 output including data indicating the position of the person depicted in the image 102, for example, as defined by the coordinates of a bounding box around the person depicted in the image 102. The person detection neural network 110 may be implemented as any appropriate neural network model, for example, as a fully-convolutional region proposal neural network, e.g., as described with reference to: S. Ren et al., "Faster R-CNN: Towards Real-Time Object Detection with Region Proposal Networks", Conference on Neural Information Processing System (NeurIPS), 2015.

The system 100 determines person features 114 which are a feature representation of the person depicted in the image 102 using the person position 112 (i.e., as generated by the person detection neural network 110) and the visual feature representation 108 (i.e., as generated by the vision neural network 106). For example, the system 100 may crop a region (e.g., defined by a bounding box) from the visual feature representation 108 corresponding to the person position 112 in the image 102. In one example, the system 100 may generate the person features 114 using differentiable ROIPooling. In ROIpooling, the system 100 crops the region from the visual feature representation 108, divides the region into a predetermined number of sub-regions (e.g., a 7×7 grid of sub-regions), and pools (e.g., averages) the contents of each sub-region to generate a fixed-size representation of the person features 114. In some implementations, to generate the person features 112, the system may process the fixed size representation of the person features 114 (e.g., generated using ROIpooling, or some other appropriate process) using one or more additional neural network layers, e.g., convolutional or fully-connected neural network layers. The person features 114 may be represented in any appropriate numerical format, e.g., as a vector or a matrix.

The person features 114 may characterize the spatio-temporal appearance of the person depicted in the image 102 (e.g., the posture, apparel, and motion of the person depicted in the image 102). However the person features 114 may not characterize the relationships between the person and other objects (and scene features) depicted in the image 102, despite these relationships potentially being pertinent to generating an accurate action localization 104. As used throughout this document, the "relationship" between a person and another object (or scene feature) refers to data that jointly characterizes the spatial and semantic characteristics of the person and the object. In one example, the relationships between the person, a basketball ball in mid-flight, and a basketball hoop depicted in the image 102 may be critical to generating an action localization 104 which accurately defines the action being performed by the person depicted in the image as "throwing a ball". Therefore, in addition to generating the person features 114, the system 100 generates relational features 116 which represent relationships between the person depicted in the image 102 and each of multiple context positions 118 in the image 102.

Each of the context positions 118 may be defined, for example, by the coordinates of a bounding box in the image 102, or the coordinates (e.g., x-y coordinates) of a particular location in the image 102. In some implementations, the system 100 identifies every pixel in the image 102 as the center of a context position 118. In some implementations, the system identifies each location in the visual feature representation (or some intermediate feature map generated by a hidden layer of the vision neural network 106) as a respective context position 118. In some implementations, the system 100 may determine the context positions 118 to be the positions of objects (e.g., cars, people, animals, and toys) depicted in the image 102. The system 100 may determine the positions of objects depicted in the image 102 by processing the image 102 using an object detection neural network 120. The object detection neural network 120 may be pre-trained to perform object detection using supervised learning techniques based on a set of training data that includes images annotated with the positions of the objects depicted in the images (e.g., bounding boxes around the objects depicted in the images).

The system 100 determines a respective feature representation (i.e., the context features 122) of each context position 118. In some implementations, the system 100 determines the context features 122 corresponding to a given context position 118 by cropping a region (e.g., defined by a bounding box) from the visual feature representation 108 corresponding to the given context position 118 in the image 102 (e.g., using differentiable ROIPooling). In some implementations, the system 100 determines the context features 122 corresponding to a given context position 118 by cropping a region from an intermediate output of the vision neural network 106 corresponding to the given context position 118 in the image 102. An intermediate output of the vision neural network 106 refers to feature representation of the image 102 generated at a hidden layer of the vision neural network 106. In some implementations, the system 100 determines the context features 122 for each context position 118 as the vector of components of the visual feature representation 108 (or of an intermediate output of the vision neural network 106) corresponding to a set of coordinates (e.g., x-y coordinates) specifying the context position.

The system 100 generates the relational features 116 by providing the person features 114 and the context features 122 as inputs to a context neural network 124. The context neural network 124 is configured to process the inputs in accordance with the current values of the context neural network parameters to generate the relational features 116, which may be represented in any appropriate numerical format (e.g., as a vector or matrix). The relational features 116 characterize the spatial and semantic relationships between the person depicted in the image 102 (as represented by the person features 114) and the context positions 118 (as represented by the context features 122).

To generate the relational features 116, the context neural network 124 may determine an "actor" representation of the person and a respective "object" representation of each context position 118. More specifically, the context neural network 124 may determine the actor representation from: (i) the person position 112, and (ii) the person features 114, e.g., by concatenating the person position 112 and the person features 114. That is, the context neural network may determine the actor representation a as:

$$a=[P(a), F(a)] \quad (1)$$

where $P(a)$ refers to data (e.g., bounding box coordinates) defining the person position, $F(a)$ are the person features. The context neural network 124 may determine the object representation of a context position 118 from: (i) the context position 118, and (ii) the context features 122 for the context position 118, e.g., by concatenating the context position 118 and the corresponding context features 122. That is, the context neural network may determine the object representation $o_j$ corresponding to context position j as:

$$o_j=[P(o_j), F(o_j)] \quad (2)$$

where $P(o_j)$ refers to data defining context position j and $F(o_j)$ are the context features for context position j. In some cases, the context neural network may represent the data defining the context position in normalized coordinates, e.g., if the context position has coordinates (j, k) in the visual feature representation, then the context neural network may represent $P(o_j)$ as:

$$\left[\frac{j}{H}, \frac{k}{W}\right],$$

where H and W are the height and the width of the visual feature representation. While the representation of each context position is referred to in this document as an object representation for convenience, certain context positions may not represent objects, e.g., certain context position may correspond to scene features such as "water" or "sky".

Figure 3A:
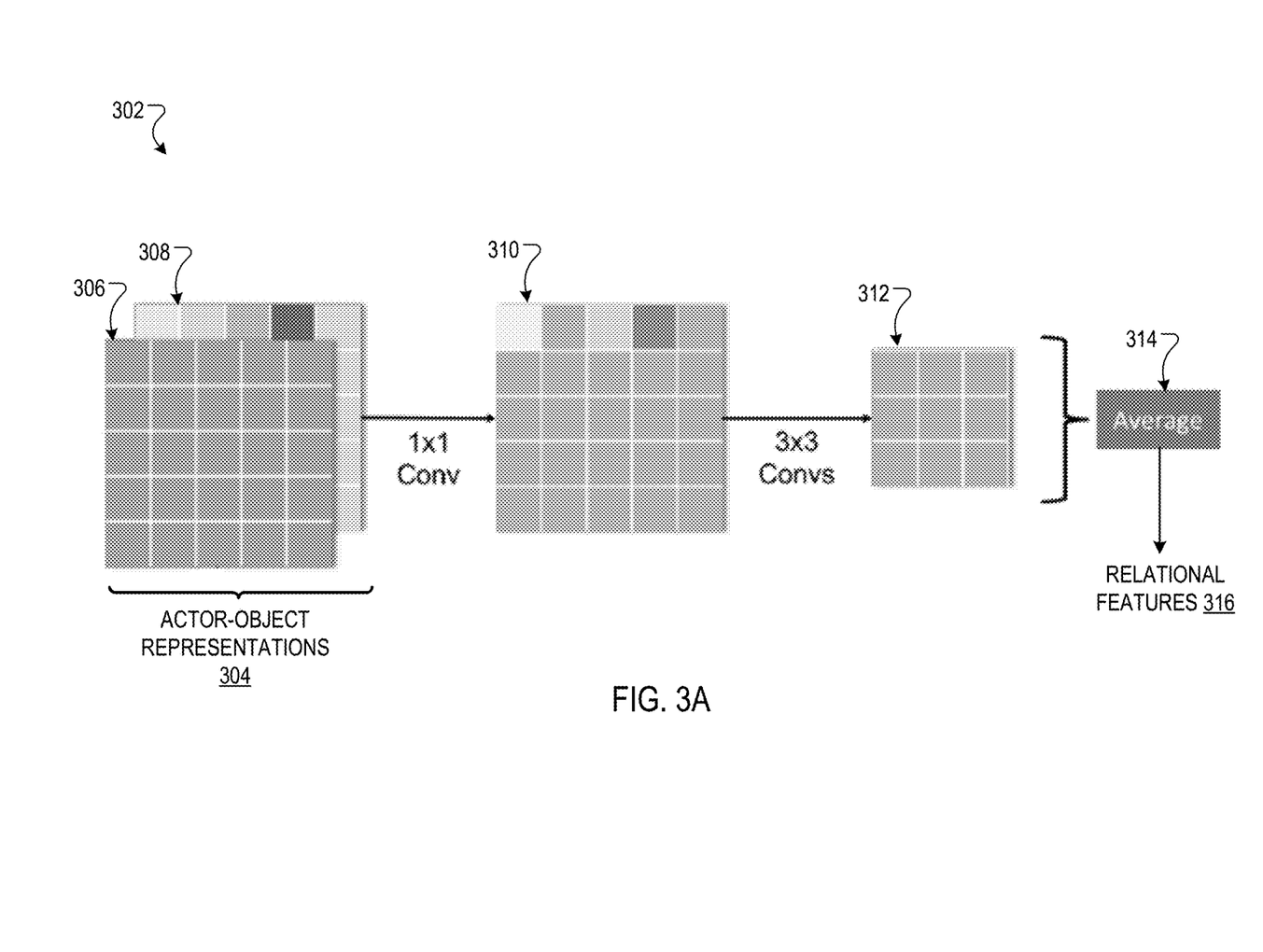
FIG. 3A and FIG. 3B illustrate example architectures of a context neural network that can be used by the action localization system to generate relational features.
Figure 3B:
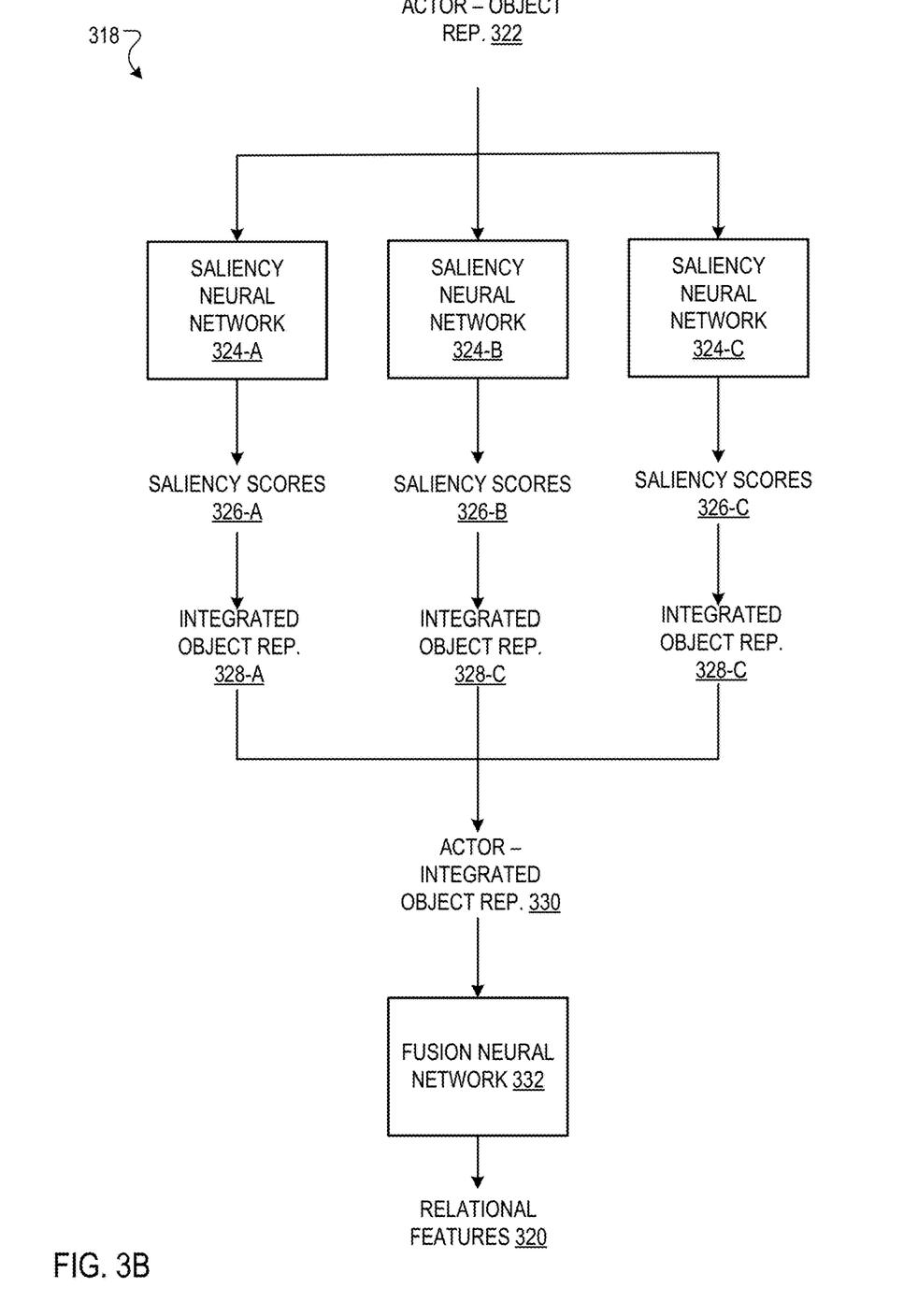

For each context position, the context neural network may generate an "actor-object" representation that jointly represents the spatial and semantic characteristics of the person and the context position from: (i) the actor representation, and (ii) the object representation of the context position. The context neural network may then generate the relational features by processing the actor-object representations in accordance with the parameter values of the context neural network. That is, the context neural network may generate the relational features R as:

$$R=f_\psi(\{[a, o_j]\}, j=1, \ldots, N) \quad (3)$$

where $f_\psi(\cdot)$ represents the operations performed by the context neural network in accordance with the parameter values ψ of the context neural network, j indexes the context positions, and N is the total number of context positions. Example architectures of the context neural network 124 are described in more detail with reference to FIG. 3A and FIG. 3B.

The system 100 determines the action 126 performed by the person depicted in the image 102 using the person features 114 and the relational features 116. For example, the system 100 may provide the concatenation of the person features 114 and the relational features 116 as an input to an action neural network 128, which is configured to process the input to generate an output defining the action 126. In particular, the action neural network 128 may generate an output that specifies a respective probability for each action in a predetermined set of possible actions, wherein the probability for each action indicates the likelihood that the person depicted in the image 102 is performing the action. In one example, the action neural network 128 may have a sequence of fully-connected or convolutional layers followed by a soft-max output layer with a respective neuron corresponding to each action in the set of possible actions. The system 100 may determine the action 126 performed by the person by sampling an action from the set of possible actions in accordance with the action probability distribution generated by the action neural network 128.

In some cases, the output generated by the action neural network 128 includes data defining a refinement of the person position 112 (e.g., to increase the accuracy of the localization of the person depicted in the image 102). For example, the action neural network 128 may generate an "x-displacement" and a "y-displacement" representing an offset that should be applied to the coordinates of a bounding box defining the person position 112, e.g., to increase the accuracy of the person position 112.

The action localization 104 output by the system 100 may specify the person position 112 (e.g., as generated by the person detection neural network 110, or the refined person position generated using the action neural network 128) and the action 126.

A training system 128 can be used to jointly train the model parameters 130 of the action localization system 100 based on a set of training data 132. The model parameters 130 of the action localization system 100 may include, e.g., the parameters of the action neural network 128, the context neural network 124, the vision neural network 106, and the person detection neural network 110. The training data 132 is composed of a set of training examples, where each training examples specifies: (i) an training image or set of training images (e.g., training video frames) depicting one or more people, and (ii) a respective target action localization output for each person depicted in the image(s). The target action localization output for a person represents the action localization output that should be generated by the action localization system for the person, i.e., specifying the location of the person and the action being performed by the person.

The training system 128 trains the model parameters 130 of the action localization system 100 over multiple training iterations until a training termination criterion is satisfied, e.g., until a predetermined number of training iterations have been performed. At each training iteration, the training system 128 can select a "batch" (i.e., set) of one or more training examples, and process the training images of the training examples in accordance with the current model parameter values 130 of the action localization system 100 to generate corresponding action localization outputs. The training system 128 can then determine gradients of an objective function that measures the similarity between the action localization outputs generated by the action localization system and the target action localization outputs specified by the training examples. In one example, the objective function $\mathcal{L}$ may be given by:

$$\mathcal{L} = \lambda \cdot \mathcal{L}_{action} + (1-\lambda) \cdot \mathcal{L}_{position} \quad (4)$$

where $\lambda$ is a hyper-parameter, e.g., in the range [0,1], $\mathcal{L}_{action}$ is a cross-entropy loss function (or another appropriate classification loss function) characterizing the accuracy of the prediction generated by the system 100 for the action performed by the person depicted in the input image(s), and $\mathcal{L}_{position}$ is a squared-error loss function (or another appropriate loss function) characterizing the accuracy of the bounding box coordinates generated by the system 100 that specify the position of the person depicted in the input image(s).

The training system 128 can train the action localization system 100 from "end-to-end", that is, by jointly adjusting the model parameters 130 using gradients of the objective function with respect to the model parameters 130. Generally, the training system 128 can determine the gradients of the objective function using any appropriate technique, e.g., backpropagation techniques, and can use the gradients to adjust the model parameters 130 using any appropriate gradient descent technique, e.g., RMSprop or Adam.

Figure 2:
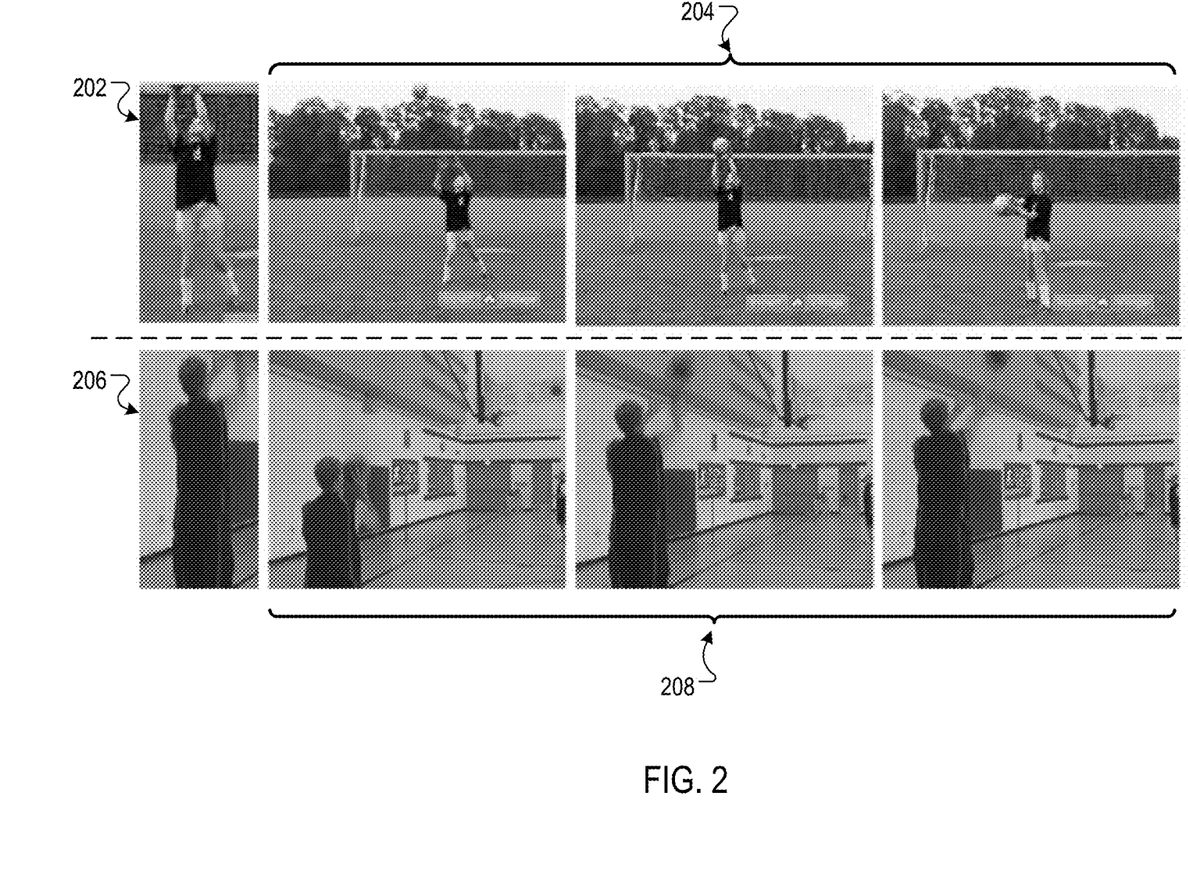
FIG. 2 illustrate examples of images and sequences of video frames that can be processed by the action localization system.

FIG. 2 illustrate examples of images and sequences of video frames that can be processed by the action localization system described with reference to FIG. 1. More specifically, the image 202 shows a region cropped from the sequence of video frames 204 depicting a person catching a ball, and the image 206 shows a region cropped from the sequence of video frames 208 depicting a person throwing a ball. It can be appreciated that (in both cases) the action being performed by the person can be identified more readily from the sequence of video frames than from the still image. The action localization system can integrate spatio-temporal information from sequences of video frames, e.g., using 3D convolutional neural network layers, thereby enabling the action localization system to identify actions more accurately than if it processed only still images. Moreover, the action localization system can predict the action being performed by the person based on relational features characterizing relationships between the person and entities (e.g., objects and scene features) depicted in the video frames. In one example, for the video frames 204, the action localization system can predict the action being performed by the person based in part on relational features that characterize the spatial and semantic relationships between the person, the ball, and the net depicted in the video frames 204.

FIG. 3A and FIG. 3B illustrate example architectures of the context neural network. As described with reference to FIG. 1, to determine the relational features, the context neural network generates a respective actor-object representation for each context position that jointly represents the spatial and semantic characteristics of the person and the context position. For example, the context neural network may generate the actor-object representation for a context position by concatenating: (i) the actor representation that includes the person position and the person features, and (ii) the object representation for the context position that includes the context position and the context features. The context neural network generates the relational features by processing the set of actor-object representations in accordance with the values of the context neural network parameters.

In the example context neural network 302 illustrated by FIG. 3A, each spatial position (e.g., represented by (j, k) coordinates) of the visual feature representation specifies a respective context position. The object representation corresponding to each context position is provided by the concatenation of: (i) the respective vector of components (e.g., having dimensionality 1×1×832) of the visual feature representation corresponding to the context position, and (ii) the normalized (j, k) coordinates of the context position. The actor representation is provided by the concatenation of: (i) the person features (e.g., having dimensionality 1×1×1024), and (ii) the normalized coordinates of the bounding box indicating the person position. The context neural network generates the actor-object representations 304 by concatenating duplicated instances 306 of the actor representation to the ordered collection of object representations 308.

The context neural network processes the actor-object representations 304 using a 1×1 convolutional layer followed by a 3×3 convolutional layer to generate the intermediate outputs 310 and 312, and then average pools 314 the intermediate output 312 to generate the relational features 316. In this example, the relational features may be represented as a vector having dimensionality 1×1×1024. Processing the actor-object representations 304 using convolutional layers allows relational information to accumulate over neighboring locations, which can result in richer relational features 316 that are more robust to outliers and varying object sizes than, e.g., directly pooling the actor-object representations 304.

In the context neural network 318 illustrated by FIG. 3B, each context position may specify a bounding box corresponding to a respective object depicted in input image(s). The object representation corresponding to each context position may be provided by the concatenation of: (i) a cropped region of the visual feature representation corresponding to the context position, and (ii) the normalized coordinates of the bounding box indicating the context position. As in FIG. 3A, the actor representation may be provided by the concatenation of: (i) the person features, and (ii) the normalized coordinates of the bounding box indicating the person position. Each actor-object representation may be provided by, e.g., the concatenation of the actor representation and a respective object representation.

The context neural network 318 generates the relational features 320 from the actor-object representations 322 using a set of multiple "saliency" neural networks (e.g., 324-A-C), which each have different parameter values and possibly have different architectures. Generally, the saliency neural networks enable the context neural network to discriminatively learn which relationships (between the person and the objects) are relevant for the action detection task, rather than considering every relationship equally (e.g., as in the architecture described with reference to FIG. 3A). More specifically, each saliency neural network is configured to process each of the actor-object representations 322 to generate a respective saliency score (e.g., 326-A-C) for each actor-object representation 322. The saliency score generated by a saliency neural network for an actor-object representation may represent a predicted relevance to the action detection task of the relationship between the person and the object corresponding to the actor-object representation. The different saliency neural networks can learn different discriminative criteria for determining which relationships are relevant to the action detection task. The saliency neural networks can have any appropriate neural network architecture, e.g., a convolutional architecture or a fully-connected architecture.

For each saliency neural network, the context neural network may normalize the saliency scores generated by the saliency neural network, e.g., by processing them using a soft-max function, and then generate an "integrated" object representation, e.g., the integrated object representations 328-A-C. For example, the context neural network may generate an integrated object representation z as:

$$z = \sum_{j=1}^{N} \alpha_j \cdot o_j \tag{5}$$

where j indexes the object representations, N is the total number of object representations, $\alpha_j$ is the (normalized) saliency score for actor-object representation j, and $o_j$ is the object representation j. In one example, the saliency score corresponding to a particular object may have a substantially larger magnitude than the other saliency scores, and the resulting integrated object representation may reflect that the particular object is highly relevant to the action detection task.

For each integrated object representation, the context neural network may generate a respective actor—integrated object representation (e.g., the actor—integrated object representations 330), e.g., by concatenating the actor representation and the integrated object representation. The context neural network may process the actor—integrated object representations using a fusion neural network 332 to generate the relational features 320. For example, the context neural network may generate the relational features R as:

$$R = \sum_{k=1}^{K} g_\theta([a, z_k]) \tag{6}$$

where k indexes the actor—integrated object representations, K is the total number of actor—integrated object representations, [a, $z_k$] represents the k-th actor—integrated object representation as the concatenation of the actor representation a and the k-th integrated object representation $z_k$, and $g_\theta(\cdot)$ represents the operations performed by the fusion neural network in accordance with the values of the fusion neural network parameters θ. (In some cases, each $g_\theta([a, z_k])$ is referred to as an "intermediate output" of the context neural network). The fusion neural network 332 can have any appropriate neural network architecture, e.g., a convolutional or fully-connected neural network architecture.

Optionally, the context neural network can include multiple "layers" of saliency neural networks. For example, context neural network can process the actor—integrated object representations 330 using another set of saliency neural networks to generate second order actor—integrated object representations, e.g., in the same way context neural network processed the actor—object representations 322 to generate the actor—integrated object representations 330. In this manner, the context neural network can generate actor—integrated object representations at progressively higher levels of abstraction, until finally processing them to generate the relational features.

Figure 4:
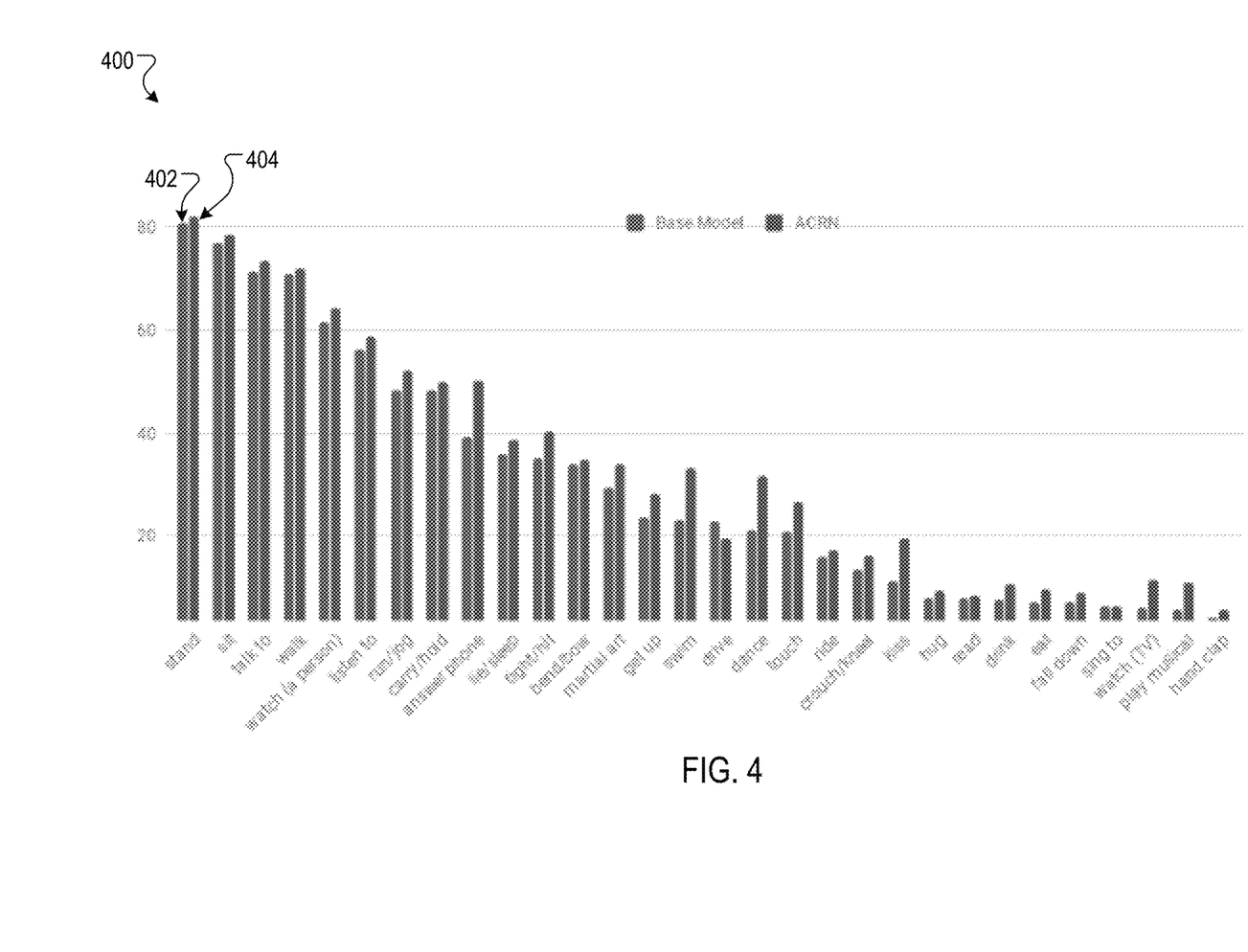
FIG. 4 illustrates an example of the performance gains that can be achieved by using the action localization system.

FIG. 4 illustrates an example of the performance gains that can be achieved by using the action localization system described in this document. In particular, the bar graph 400 shows the average precision of: (i) the action localization system described in this document, and (ii) a "baseline" action localization system that does not use relational features, for each of multiple categories of action (e.g., stand, sit, talk to, etc.). In particular, for each category of action, the bar graph 400 shows a first bar (e.g., the bar 402) that indicates the average precision of the baseline action localization system for the action, and a second bar (e.g., the bar 404) that indicates the average precision of the action localization system described in this document for the action. It can be appreciated that using relational features enables the action localization system described in this specification to generally outperform the baseline action localization system.

Figure 5:
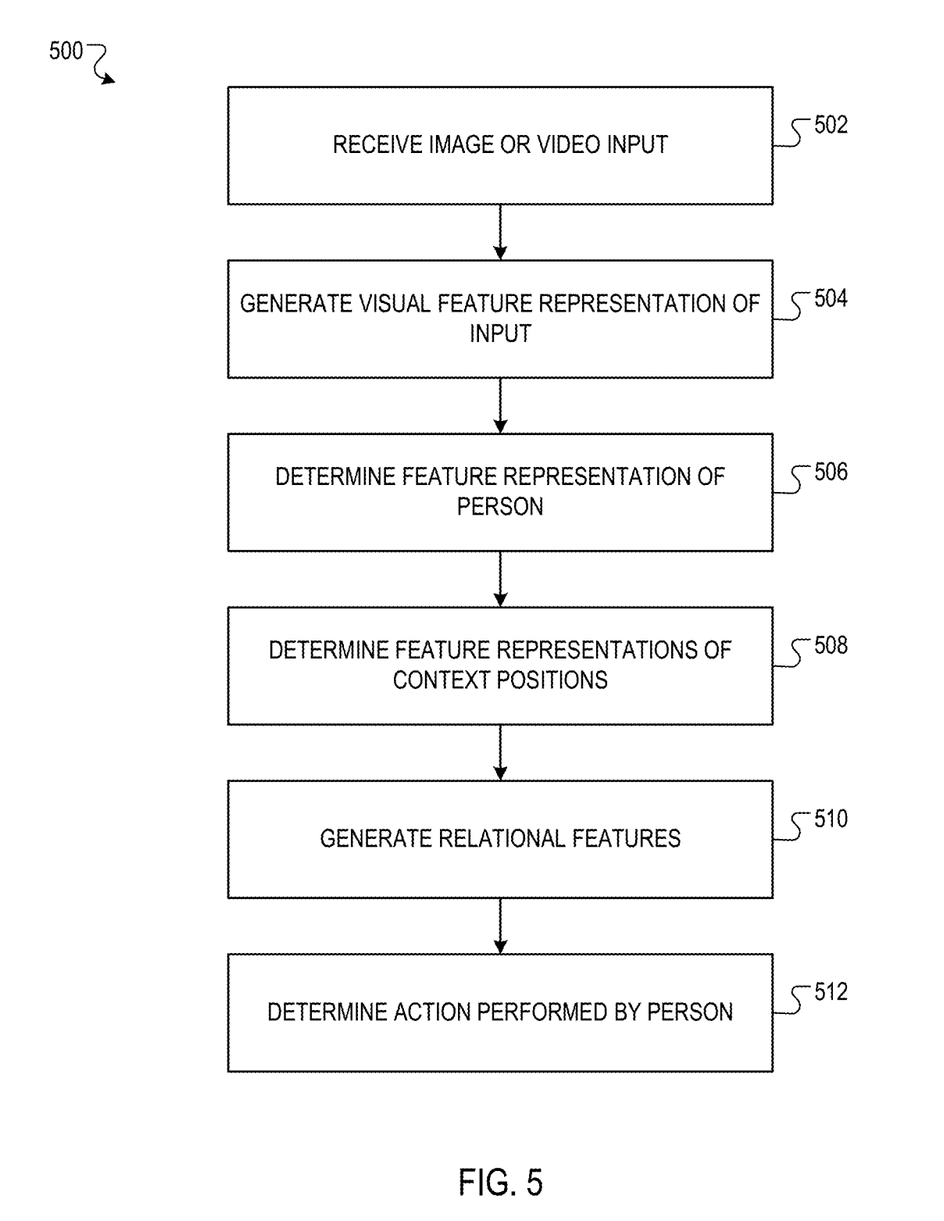
FIG. 5 is a flow diagram of an example process for performing action localization.

FIG. 5 is a flow diagram of an example process 500 for performing action localization. For convenience, the process 500 will be described as being performed by a system of one or more computers located in one or more locations. For example, an action localization system, e.g., the action localization system 100 of FIG. 1, appropriately programmed in accordance with this specification, can perform the process 500.

The system receives an input that includes an image depicting one or more people (502). In some cases, the input is a video that includes multiple video frames, i.e., each of which is a respective image.

The system provides an input including the image to a vision neural network to obtain a visual feature representation of the image (504). In some cases, the input is a sequence of multiple video frames, and the system provides the video frames to the three-dimensional convolutional vision neural network to obtain a visual feature representation of the video frames.

The system determines a respective feature representation for each of one or more people depicted in the image (506). To determine the respective feature representations of the people depicted in the image, the system provides an input including the image to a person detection neural network to obtain data (e.g., bounding boxes) indicating the positions of people depicted in the image. The person detection neural network may be, e.g., a convolutional region proposal neural network. For each person depicted in the image, the system can determine the feature representation of the person using the data indicating the position of the person and the visual feature representation, e.g., by cropping the region of the visual feature representation corresponding to the position of the person. Generally, the system can determine a respective feature representation for each person depicted in the image, and use the feature representation to detect the action being performed by the person. For convenience, steps 508-512 of the process 500 describe detecting the action being performed by a particular person depicted in the image.

The system identifies multiple context positions in the image and determines a respective feature representation of each context position (508). The system may identify every position in the image as a context position, or the system may identify only a proper subset of the positions in the image as context positions. In one example, the system may process the image using an object detection neural network that is trained to detect objects (e.g., people, dogs, cats, vehicles, computers, etc.) to identify bounding boxes around each object in the image. Thereafter, the system may identify each bounding box that is predicted to enclose an object (i.e., excluding the person that is the subject of the action localization) as a respective context position. The system may determine the feature representation of a context position, e.g., by cropping a region of the visual feature representation (or a region of an intermediate output of the vision neural network) corresponding to the context position.

The system provides the feature representation of the person and the feature representations of each of the context positions to a context neural network to obtain relational features (510). The relational features represent relationships (e.g., spatial and semantic relationships) between the person and the context positions. To determine the relational features, the system can determine an actor representation from: (i) the feature representation of the person, and (ii) the position of the person. The system can further determine a respective object representation for each context position from: (i) the feature representation of the context position, and (ii) the context position. The system can process the actor representation and the object representations using the context neural network to obtain the relational features. A few examples of how the system can generate the relational features follow.

In one example, for each object representation, the system may process a pair of representations including the actor representation and the object representation by one or more context neural network layers to generate an intermediate output, and thereafter generate the relational features from the intermediate outputs. For example, the system may generate the relational features by average pooling the intermediate outputs. As another example, the system may generate the relational features by processing the intermediate outputs by one or more convolutional context neural network layers, and average pooling the convolutional context neural network layer outputs.

In another example, the system may generate the relational features based on a set of integrated object representations, each of which corresponds to a respective saliency neural network. Determining the integrated object representation corresponding to a saliency neural network may include, for each object representation, processing a pair of representations including the actor representation and the object representation by the corresponding saliency neural network to generate a respective saliency score. Thereafter, the system can determine the integrated object representation by combining the object representations using the saliency scores. For each integrated object representation, the system may process a pair of representations including the actor representation and the integrated object representation by one or more context neural network layers to generate an intermediate output, and thereafter generate the context features based on the intermediate outputs (e.g., by summing them).

The system determines the action performed by the person using the feature representation of the person and the relational features (512). For example, the system may provide the feature representation of the person and the relational features as an input to an action neural network that is configured to generate an output defining the action performed by the person.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system, comprising:
   a data processing apparatus;
   a memory in data communication with the data processing apparatus and storing instructions that cause the data processing apparatus to perform operations comprising:
   receiving an input comprising an image;
   providing the image to a vision neural network to obtain a visual feature representation of the image;
   providing the image to a person detection neural network to obtain data indicating a position of a person depicted in the image;
   determining a feature representation of the person using the data indicating the position of the person and the visual feature representation of the image;
   identifying a plurality of context positions from the image;
   determining respective feature representations of each of the context positions;
   providing the feature representation of the person and the feature representations of each of the context positions to a context neural network to obtain relational features, wherein the relational features represent relationships between the person and the context positions, wherein obtaining the relational features comprises:
   determining an actor representation from: (i) the feature representation of the person, and (ii) the position of the person;
   for each context position, determining an object representation of the context position from: (i) the feature representation of the context position, and (ii) the context position; and
   processing the actor representation and the object representations using the context neural network to obtain the relational features; and
   determining an action performed by the person using the feature representation of the person and the relational features.

2. The system of claim 1, wherein:
   the vision neural network is configured to:
   receive an input comprising an image, and
   process the input to generate a visual feature representation of the image; the person detection neural network is configured to:
   receive an input comprising an image, and
   process the input to generate an output comprising data indicating a position of a person depicted in the image; and
   the context neural network is configured to:
   receive an input comprising: (i) a feature representation of a person depicted in an image, and (ii) feature representations of each of a plurality of context positions from the image, and
   process the input to generate an output comprising a plurality of relational features, wherein the relational features represent relationships between the person and the context positions.

3. The system of claim 1, wherein the image is a video frame, and the input further comprises a plurality of additional video frames.

4. The system of claim 1, wherein the vision neural network is a three-dimensional convolutional neural network.

5. The system of claim 1, wherein the person detection neural network is a convolutional region proposal neural network.

6. The system of claim 1, wherein determining a feature representation of the person using the data indicating the position of the person and the visual feature representation of the image comprises:
   cropping a region of the visual feature representation corresponding to the position of the person in the image.

7. The system of claim 1, wherein identifying a plurality of context positions from the image comprises:
   identifying every position in the image as a context position.

8. The system of claim 1, wherein identifying a plurality of context positions from the image comprises:
   processing the image using an object detection neural network to obtain data indicating respective positions of a plurality of objects depicted in the image.

9. The system of claim 1, wherein determining a feature representation of a context position comprises:
   cropping a region of the visual feature representation corresponding to the context position.

10. The system of claim 1, wherein determining a feature representation of a context position comprises:
    cropping a region of an intermediate output of the vision neural network corresponding to the context position.

11. The system of claim 1, wherein determining an action performed by the person using the feature representation of the person and the relational features comprises:
    providing the feature representation of the person and the relational features as an input to an action neural network, wherein the action neural network is configured to generate an output comprising data defining an action performed by the person.

12. The system of claim 11, wherein the action neural network, the context neural network, the vision neural network, and the person detection neural network are jointly trained by an end-to-end machine learning training technique.

13. The system of claim 1, wherein processing the actor representation and the object representations using the context neural network to obtain the relational features comprises:
for each object representation, processing a pair of representations comprising the actor representation and the object representation by one or more context neural network layers to generate an intermediate output; and
generating the relational features from the intermediate outputs.

14. The system of claim 13, wherein generating the relational features from the intermediate outputs comprises:
average pooling the intermediate outputs.

15. The system of claim 13, wherein generating the relational features from the intermediate outputs comprises:
processing the intermediate outputs by one or more convolutional context neural network layers and average pooling the convolutional context neural network layer outputs.

16. The system of claim 1, wherein processing the actor representation and the object representations using the context neural network to obtain the relational features comprises:
determining a plurality of integrated object representations, wherein each integrated object representation is associated with a respective saliency neural network, and wherein determining an integrated object representation comprises:
for each object representation, processing a pair of representations comprising the actor representation and the object representation by the saliency neural network associated with the integrated object representation to generate a respective saliency score;
determining the integrated object representation by combining the object representations using the saliency scores;
for each integrated object representation, processing a pair of representations comprising the actor representation and the integrated object representation by one or more context neural network layers to generate an intermediate output; and
generating the relational features from the intermediate outputs.

17. The system of claim 16, wherein determining the integrated object representation by combining the object representations using the saliency scores comprises:
processing the saliency scores by a soft-max layer.

18. A computer-implemented method comprising:
receiving an input comprising an image; providing the image to a vision neural network to obtain a visual feature representation of the image;
providing the image to a person detection neural network to obtain data indicating a position of a person depicted in the image;
determining a feature representation of the person using the data indicating the position of the person and the visual feature representation of the image;
identifying a plurality of context positions from the image;
determining respective feature representations of each of the context positions;
providing the feature representation of the person and the feature representations of each of the context positions to a context neural network to obtain relational features, wherein the relational features represent relationships between the person and the context positions wherein obtaining the relational features comprises:
determining an actor representation from: (i) the feature representation of the person, and (ii) the position of the person;
for each context position, determining an object representation of the context position from: (i) the feature representation of the context position, and (ii) the context position; and
processing the actor representation and the object representations using the context neural network to obtain the relational features; and
determining an action performed by the person using the feature representation of the person and the relational features.

19. One or more non-transitory computer storage media storing instructions that when executed by one or more computers cause the one or more computers to perform operations comprising:
receiving an input comprising an image;
providing the image to a vision neural network to obtain a visual feature representation of the image;
providing the image to a person detection neural network to obtain data indicating a position of a person depicted in the image;
determining a feature representation of the person using the data indicating the position of the person and the visual feature representation of the image;
identifying a plurality of context positions from the image;
determining respective feature representations of each of the context positions;
providing the feature representation of the person and the feature representations of each of the context positions to a context neural network to obtain relational features, wherein the relational features represent relationships between the person and the context positions wherein obtaining the relational features comprises:
determining an actor representation from: (i) the feature representation of the person, and (ii) the position of the person;
for each context position, determining an object representation of the context position from: (i) the feature representation of the context position, and (ii) the context position; and
processing the actor representation and the object representations using the context neural network to obtain the relational features; and
determining an action performed by the person using the feature representation of the person and the relational features.

* * * * *